United States Patent
Busch et al.

(10) Patent No.: US 6,247,390 B1
(45) Date of Patent: Jun. 19, 2001

(54) HYDRAULICALLY OPERATED ROTARY ACTUATOR

(75) Inventors: Werner Busch, Weinstadt; Jörg Rösener; Wolfgang Speier, both of Stuttgart; Thomas Szell, Waiblingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/286,924

(22) Filed: Apr. 6, 1999

(30) Foreign Application Priority Data

Apr. 6, 1998 (DE) ............................................. 198 15 314

(51) Int. Cl.⁷ ...................................................... F01B 3/00
(52) U.S. Cl. .................................................. 92/33; 92/136
(58) Field of Search .................................. 92/31, 32, 33, 92/136

(56) References Cited

U.S. PATENT DOCUMENTS

| | | | |
|---|---|---|---|
| 4,300,641 | * 11/1981 | Kinkel | 92/33 X |
| 4,313,367 | * 2/1982 | Weyer | 92/33 |
| 4,590,816 | * 5/1986 | Weyer | 92/31 X |
| 4,667,528 | * 5/1987 | Weyer | 92/33 X |
| 4,748,866 | * 6/1988 | Weyer | 74/424.8 R |
| 4,846,007 | * 7/1989 | Weyer | 92/33 X |
| 4,881,419 | * 11/1989 | Weyer | 92/33 X |
| 5,671,652 | * 9/1997 | Weyer | 92/33 |

FOREIGN PATENT DOCUMENTS

| | | |
|---|---|---|
| 1 179 124 | 10/1964 | (DE) . |
| 39 09 910 | 9/1990 | (DE) . |
| 43 37 813 | 5/1995 | (DE) . |
| 0 190 400 | 8/1986 | (EP) . |
| 0 428 439 | 5/1991 | (EP) . |
| 0 458 345 | 11/1991 | (EP) . |
| 0 697 526 | 2/1996 | (EP) . |
| 2 455 201 | 11/1980 | (FR) . |
| 1 311 645 | 3/1973 | (GB) . |

\* cited by examiner

Primary Examiner—John E. Ryznic
(74) Attorney, Agent, or Firm—Kenyon & Kenyon

(57) ABSTRACT

A rotary actuator that can be used in conjunction with drive stabilizers for motor vehicles. The rotary actuator includes an outer body forming a gas-tight connection for a first element capable of being turned opposite from a second element, and an inner body coaxial with the outer body and covered by the outer body axially over a full length of the inner body. The inner body and the outer body define an annular space and turn axially in opposite directions, the inner body forming a gas-tight connection for a second element. A sleeve is disposed in the annular space and includes an annular piston and a bushing axially connected to the annular piston, the annular piston moving on cylindrical surfaces of the inner body and the outer body. The annular piston defines two working chambers capable of being acted upon by pressure. The bushing includes oppositely-angles helical teeth on a radially inner on radial inner and outer sides which engage on the inner body and the outer body. The rotary acutuator has an especially compact design with favorable force uptake and advantageous assembly requirements.

26 Claims, 2 Drawing Sheets

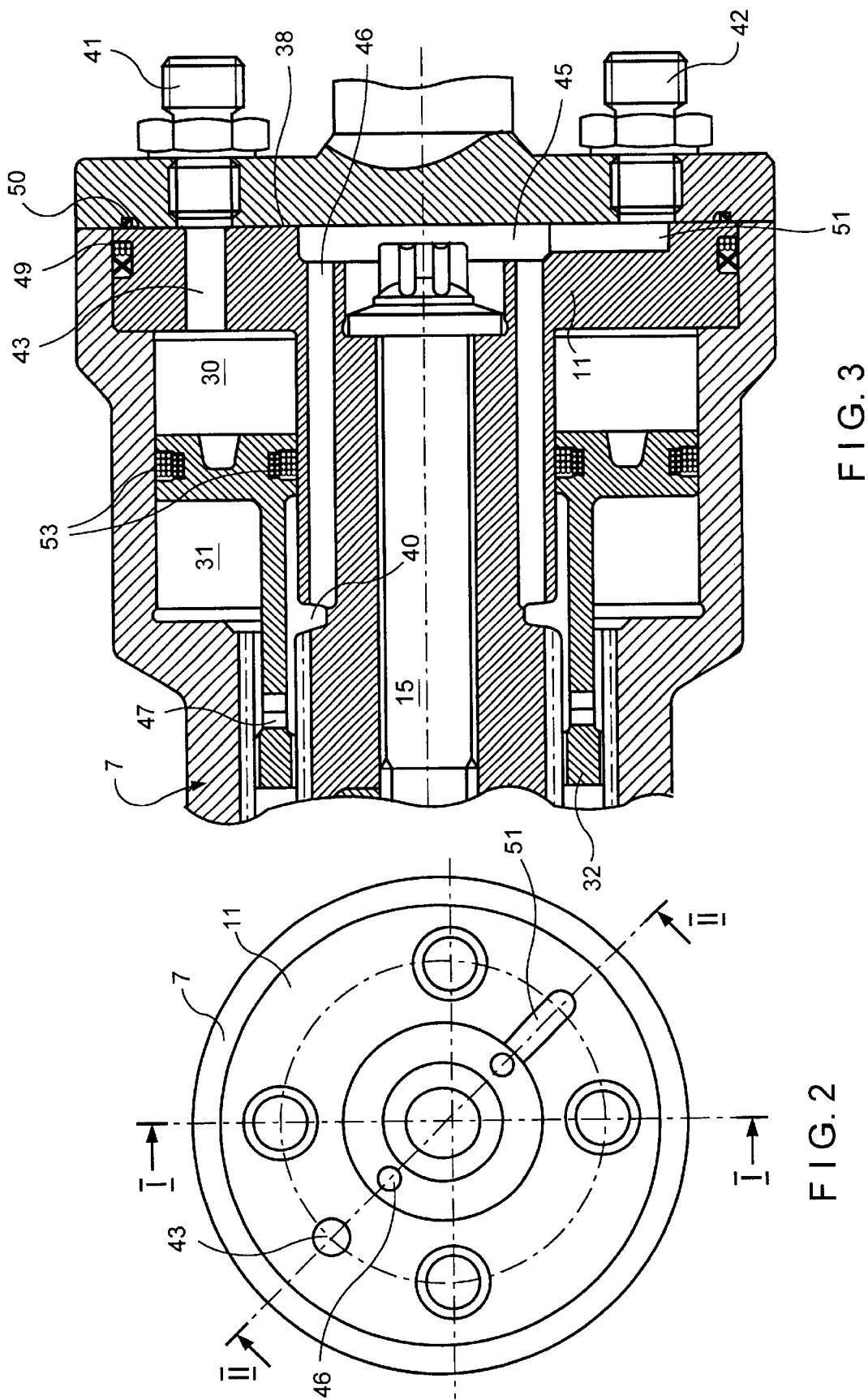

HYDRAULICALLY OPERATED ROTARY ACTUATOR

FIELD OF THE INVENTION

The present invention concerns a hydraulically operated rotary actuator.

RELATED TECHNOLOGY

A rotary actuator described in European Patent No. 0428439 No. A1 has two axially joined, partially overlapping housing halves which together border an inner space and develop axially toward the outside into neck-like projections. These have axial receptacle orifices for form-fitting locking with elements which can turn in opposite directions in the form of web parts of a rotation stabilizer which are connected coaxially via the rotary actuator. With the basic U shape of the rotation stabilizers conventional with drive stabilizers, the web parts of the rotation stabilizer bear stabilizer arms that run in the longitudinal direction of the vehicle at their mutually remote ends, these arms acting on the wheels of one axle which are connected to one another via the drive stabilizer, or acting on their guide elements.

Of the two partially overlapping housing halves of the rotary actuator provided in extension of one another, one housing half has a shoulder as an inner body concentric with the common axis, projecting into the inside of the housing in such a way that the jacket part of this housing half together with the inner body formed by its central shoulder borders an annular space in which is arranged an annular piston provided with a bushing extending toward the other housing half, overlapping the shoulder and closed on its remote end and partially covered by the jacket part of the other housing part as the outer body. The purpose of this design is to create a first working chamber between the annular piston and the adjacent end face of the annular space, with a second working chamber being formed opposite the former, between the other housing half and the end-face closure of the sleeve. Thus, a working chamber having a ring cross section on the one hand and a working chamber having a circular cross section on the other hand are provided for the opposite ends of the housing. Between them, the teeth required for the rotational adjustment are provided between the inner body and the piston on the one hand and the bushing and the outer body on the other hand, with the piston also extending over a toothed area of the inner body, so that only a relatively small ring cross section is available as the piston cross section based on a given outer diameter.

A rotary actuator designed in this way, with the axially mutually overlapping housing halves being braced axially and with respect to one another so they can rotate about their common axis over exterior bearing collars, is complicated, takes a relatively long time to manufacture and necessitates removal of the drive stabilizer for installation and removal of the rotary actuator because of the axial overlap with the web parts.

SUMMARY OF THE INVENTION

The present invention provides a rotary actuator having a simple and compact design, and due to its construction, the present invention also offers favorable assembly requirements.

The present invention therefor provides a hydraulically operated rotary actuator (1) having an outer body (7) and an inner body (8) coaxial with the former and covered by the outer body axially over its full length, fixed with respect to one another so they can turn axially in opposite directions, each forming a gas-tight connection for an element (2 or 3) of two elements (2, 3) to be turned opposite from one another and bordering an annular space (12) in which is arranged a sleeve having an annular piston (29) and axially connected to it a bushing (32), of which the annular piston (29) moves on cylindrical surfaces of inner body (8) and outer body (7) and separates from one another two working chambers (30, 31) that can be acted upon by pressure, and of which the bushing (32) is provided with helical teeth (35, 36) on the inside radially and on the outside radially, engaging with corresponding teeth (37, 34) on the inner body (8) and the outer body (7) having a different sweep of the teeth.

In accordance with the present invention, the parts of the rotary actuator which are to be adjusted relative to one another, i.e., the parts of a rotary actuator that are to be connected to the web parts of a stabilizer, for example, may be arranged one inside the other, so that the inner part is covered by the outer part to be turned oppositely from it, and the respective drive pinions can be assigned to the inner part on the one hand and to the outer part on the other hand. In conjunction with such a design, the piston area and the toothed area can be separated axially, so that relatively large piston areas can be achieved with a compact design. In particular, however, this yields a unit which can easily be arranged with all working parts between the respective drive pinions and the elements to be turned in opposite directions, so that the flanges assigned to the drive pinions can also form cover parts of the rotary actuator, resulting in a shortening and further simplification of the overall construction, and making it less expensive.

It is especially advantageous within the scope of the present invention to mount the inner body and outer body radially and axially over ring collars provided for the inner body and axially covering the annular space between the inner body and the outer body, so that the compressive forces applied as a result of the force acting on the piston in turn act as tensile forces on the inner body by way of the collars and can be absorbed through appropriate bracing of the collars over the inner body.

BRIEF DESCRIPTION OF THE DRAWINGS

The present invention is elucidated in greater detail below with reference to the drawings, in which:

FIG. 2 shows a simplified elevational view of the rotary actuator of FIG. 1; and FIG. 3 shows a section of the right-hand side end area of the rotary actuator of FIG. 1 through line II—II of FIG. 2.

DETAILED DESCRIPTION

Figure 1:
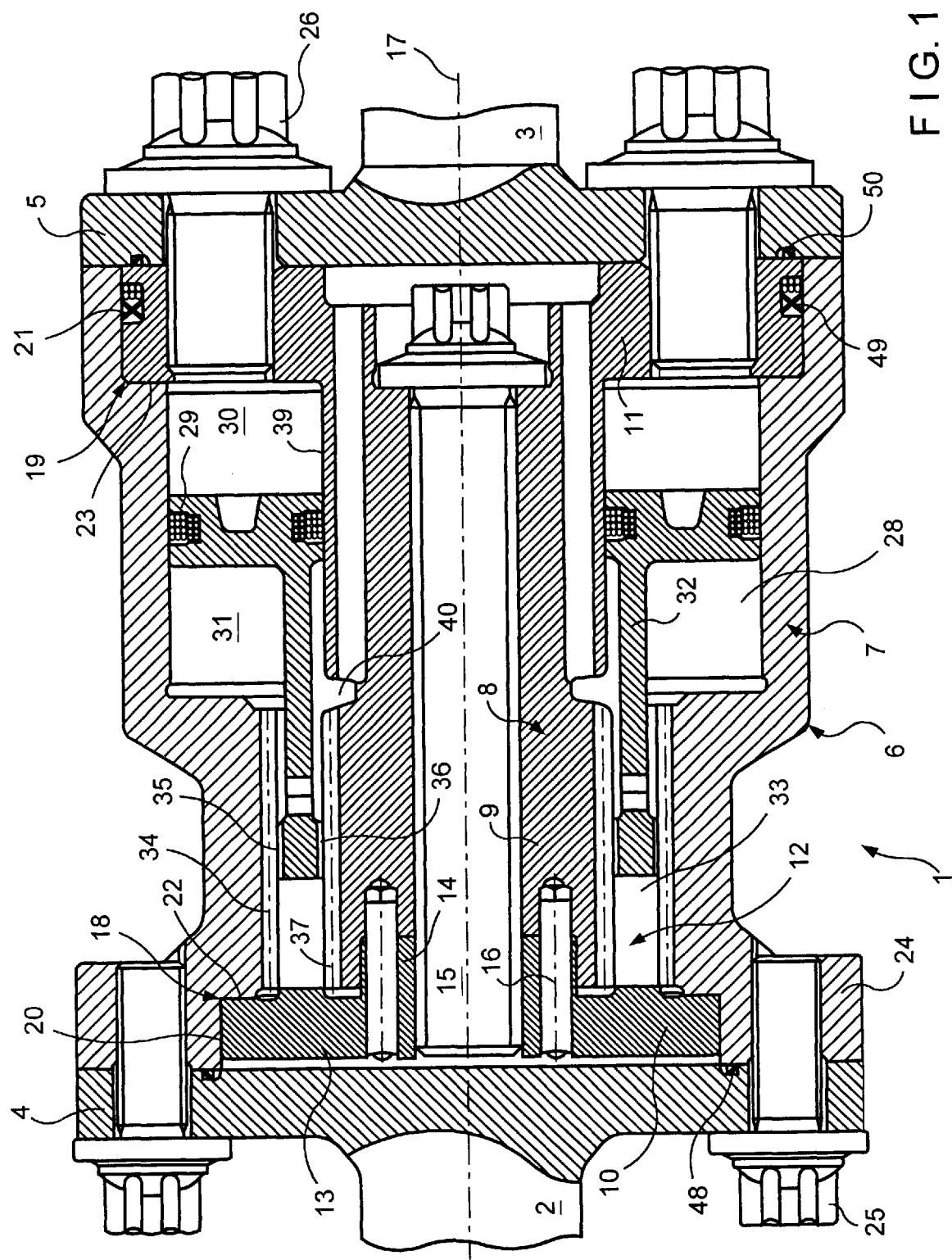
FIG. 1 shows a section through a rotary actuator according to the present invention through line I—I of FIG. 2.

Only the rotary actuator of a driving stabilizer for motor vehicles is shown in the figures, assuming that a known general arrangement exists for this device, for example, according to FIG. 1 of European Patent Application No. 0458345 A2, which is herewith incorporated by reference herein.

The rotary actuator labeled with 1 in the embodiments is located axially between spider parts 2, 3 of the driving stabilizer, preferably in the longitudinally central area of the vehicle. Spider parts 2, 3, of which only the areas of connection to the rotary actuator are shown, blend into the stabilizer arms at their ends extending along the longitudinal sides of the vehicle that are not illustrated here, and are fastened to the stabilizer arms, which extend roughly in the longitudinal direction of the vehicle and impact parts of the respective wheel suspension system of opposite wheels of an axle, which are connected by the driving stabilizer. In this embodiment, spider parts 2, 3 are connected as one piece to flanges 4, 5, which form covers at the same time, which are provided as a lateral front end of rotary actuator 1.

The operating parts of rotary actuator 1 are associated with its central part 6 located between flanges 4, 5, which serve as covers. They include an outer body 7 and an inner body 8, outer body 7 forming the axial support of flanges (covers) 4, 5 as an annular jacket. In contrast with outer body 7, which is preferably designed as one piece, in this embodiment inner body 8 is designed basically with a middle piece 9, which is provided at its ends with ring collars 10 and 11, which have a larger diameter than middle piece 9, and which axially delimit annular space 12 located between outer body 7 and middle piece 9.

Of the two ring collars 10 and 11, ring collar 10 has a smaller outer diameter than ring collar 11 and is a component of a disk 13, which is guided with respect to middle piece 9 via a guide neck 14, which axially extends into middle piece 9.

Disk 13 is traversed by a central threaded hole in the area of central guide neck 14 and is fastened to central part 9 via a central fastening bolt 15. In addition to this fastening, which results in a friction-type connection, middle piece 9 is also form-fittingly connected to disk 13 in the area of guide neck 14, preferably via pins 16, so that a non-rotatable, virtually rigid connection is obtained between middle piece 9 and disk 13 with ring collar 10. At the opposite end, middle piece 9 blends into ring collar 11, according to the present invention, preferably as one piece. The radial diameter of ring collar 11 is greater than that of ring collar 10. Both ring collars 10 and 11, which axially and radially guide inner body 8 in outer body 7 coaxially to the latter—the axes of rotation of rotary actuator 1 and of spider parts 2, 3 being labeled as 17—are supported by shoulders 18, 19 of outer body 7. Shoulders 18, 19 are provided in the ends on the internal periphery of outer body 7 and form radial bearing surfaces 22, 23 and axial support surfaces 20, 21 for ring collars 10, 11. As inner body 8 is axially fastened by fastening bolt 15, it is solidary vis-a-vis outer body 7. Inner body 8 does not project beyond outer body 7 at the ends, and outer body 7 virtually forms central part 6 of the rotary actuator housing.

Of flanges (covers) 4 and 5, flange 4, which is associated with the front of rotary actuator 1 that is in contact with ring collar 10 having the smaller diameter, is bolted to central part 6 of the housing against a radial flange connection 24 of central part 6, which extends radially outward, shoulder 18 being located radially inward. In the embodiment, the bolt connection is implemented using four fastening bolts 25, bolts 25 creating a friction connection between the cover formed by flange 4 and central part 6.

On the other end face of rotary actuator 1, which is associated with the ring collar 11 having the larger diameter, this ring collar forms the support surface for flange 5, serving as a cover, with a friction connection being established between flange 5 and the adjacent end face of ring collar 11 via fastening bolts 26. The threaded holes for fastening bolts 26 are provided in ring collar 11 are denoted with 27 in FIG. 1.

Annular space 12 between outer body 7 and inner body 8 has different widths along its axial length, annular space part 28 having a larger width being provided adjacent to ring collar 11. An annular piston 29 with seals 53 is arranged axially movably in annular space part 28, dividing annular space part 28 into two working chambers 30 and 31. Radially inward, on its side facing ring collar 10, annular piston 29 has a bushing 32 as a neck-shaped extension, which protrudes into an annular space part 33, which has a smaller width than annular space part 28 and constitutes an axial extension of the latter. The outer diameter of inner body 8 in the area of its middle piece 9 corresponds, over the length of middle piece 9, to the inner diameter of piston 29 and bushing 32, and outer body 7 is drawn inward in the area corresponding to annular space part 33 having a smaller width.

Bushing 32 is provided, in its end area (not illustrated in detail) distant from annular piston 29, with helical gearing radially inside and radially outside in an essentially known manner. These gearings are angled in opposite directions and each is engaged with a counter-gearing associated with outer body 7 and inner body 8, respectively. The respective gearings are labeled in FIG. 1 with 34 for outer body 7, with 35 for the outer periphery of bushing 32, with 36 for the inner periphery of the bushing, and with 37 for the outer periphery of inner body 8.

Gearing 37 is axially offset with respect to guide surface 39 provided on inner body 8 for piston 29 by a flute 40 provided in the outer periphery of inner body 8. Flute 40 is positioned approximately at the height of the side of annular space part 28 facing away from ring collar 11.

Annular piston 29 receives pressure, in particular, hydraulic pressure, via the supply of a pressure medium to working chambers 30 and 31, as shown in FIG. 3 in conjunction with FIG. 2, through axial fittings 41, 42, associated with the front face of the cover, formed by flange 5, adjacent to ring collar 11. Working chamber 30, adjacent to ring collar 11, is directly supplied via fitting 41 and orifice 43 in ring collar 11, while working chamber 31 is connected to fitting 42. This connection runs basically within inner body 8, a distribution chamber 45, closed by flange 5 as a cover and provided in ring collar 11, being provided centrally around head space 44 of fastening bolt 15. Distribution holes 46 go from distribution chamber 45 to flute 40, which is covered by the inner periphery of bushing 32 with a radial gap between them. Furthermore, at least one radial hole 47 is provided in bushing 32 in the transition region located upstream from gearings 35 and 36. The pressure medium exits through this radial hole 47 to the area of bushing 32 offset radially inward with respect to gearing 34 of outer body 7 and thus enters annular space part 28.

Thus, with a method according to the present invention, the supply pathways are located within central part 6, so that no leakage may occur, and only a minimum amount of sealing is required. According to the present invention, flange 4 is sealed with respect to outer body 7 directly, preferably via a seal ring 48.

On the opposite side, the seal between ring collar 11 and outer body 7 is provided via the sole seal 49, according to the present invention, between movable parts.

Furthermore, a ring seal 50 is provided between flange 5 and ring collar 11, which is fixedly attached to it, so that no individual seals are needed in the area of fittings 41 and 42 if, as illustrated, fitting 41, as it blends into orifice 43, is connected to distribution chamber 45 by an approximately tight contact between flange 5 and end face 38 of ring collar 11.

In particular, FIGS. 2 and 3 show that fitting 42 is connected to distribution chamber 45 via a branch channel 51, which is machined into end face 38 of ring collar 11 associated with flange 5.

Building on the principle described in, for example, European Patent Application 0428439 No. A1, a rotary actuator having compact dimensions and very advantageous assembly characteristics is provided. By using connecting flanges 4 and 5 of spider parts 2 and 3 as covers, further simplification and a particularly compact and short design are achieved. Furthermore, a method according to the present invention is characterized by the fact that only internal oil channels are provided, resulting in a very advantageous construction also from the point of view of sealing. This also allows axial connections, which is particularly advantageous due to the space constraints in vehicles.

The associated control devices for supplying pressure medium into the working chambers are not illustrated in detail, but they can be formed by distributing valves. In a preferred embodiment, a 3/2-way valve, in particular a proportional valve, is provided, so that any position, including, in particular, a mid-position, can be set. In the mid-position, the fittings can be closed, so that the rotary actuator acts as a solid connecting piece between the spider parts connected to it.

Furthermore, the mid-position can also be set as a floating position, so that the spider parts are freely movable with respect to one another. Thus, programmable or freely selectable chassis effects that can be influenced by a drive stabilizer can be used, depending on predefined driving programs, as predefined or freely selectable effects.

In this context, it can also be advantageous according to the present invention if the gearings are designed so that a self-blocking effect is obtained, i.e., the spider parts cannot rotate with respect to one another unless the adjustment piston is actively acted upon.

Combining working parts of the rotary actuator in a middle part 6 which can be inserted radially between flange parts 4, 5 also yields great benefits for any maintenance and repair work, because middle part 6 can be inserted as an assembly unit between flanges 4 and 5, which serve as covers.

What is claimed is:

1. A hydraulically operated rotary actuator comprising:
   an outer body forming a gas-tight connection for a first element capable of being turned in a direction opposite from a turning direction of a second element;
   an inner body coaxial with the outer body and covered by the outer body axially over a full length of the inner body, the inner body and the outer body defining an annular space and being fixed with respect to one another so as to enable them to turn axially in opposite directions, the inner body forming a gas-tight connection for the second element;
   a first cover attached to the inner body for axially sealing the inner body and a second cover attached to the outer body for axially sealing the outer body; and
   a sleeve disposed in the annular space and including an annular piston and a bushing axially connected to the annular piston, the annular piston moving on cylindrical surfaces of the inner body and the outer body and defining first and second working chambers capable of being acted upon by pressure, the bushing including first helical teeth on a radially inner side and second helical teeth on a radially outer side, the first helical teeth being oppositely angled from the second helical teeth, the first helical teeth engaging first corresponding teeth on the inner body and the second helical teeth engaging second corresponding teeth on the outer body.

2. The rotary actuator as recited in claim 1 wherein the inner body includes first and second ring collars for supporting the inner body with respect to the outer body, and a middle part disposed between the first and second ring collars, having essentially a same diameter over a length, the same diameter being less than a diameter of the first ring collar and diameter of the second ring collar, and wherein the annular space includes first and second annular sections having different ring widths, the first and second annular sections disposed axially with respect to one another.

3. The rotary actuator as recited in claim 2 wherein the first annular section has a greater ring width than the second annular section, the annular piston being disposed in the first annular section.

4. The rotary actuator as recited in claim 2 wherein the annular piston divides the first annular section into two working chambers and includes a bushing extending into the second annular section.

5. The rotary actuator as recited in claim 1 wherein the outer body forms an annular jacket including an end face, the end face having shoulders disposed on a radially inward side, the inner body being supported radially and axially against the shoulders.

6. The rotary actuator as recited in claim 2 wherein the second ring collar is one piece with the middle part.

7. The rotary actuator as recited in claim 2 wherein the first ring collar is attached to the middle part.

8. The rotary actuator as recited in claim 7 wherein the first ring collar includes a central guide neck axially engaging the middle part.

9. The rotary actuator as recited in claim 7 further comprising a central clamping screw for urging the first ring collar against the middle part.

10. The rotary actuator as recited in claim 9 wherein the first ring collar is connected to the middle part in a form-fitting and rotationally fixed manner.

11. The rotary actuator as recited in claim 2 wherein the first and second ring collars have different outer diameters.

12. The rotary actuator as recited in claim 11 wherein the second ring collar forms an end wall of the first working chamber.

13. The rotary actuator as recited in claim 12 wherein the second ring collar includes a first axial supply bore passing therethrough and opening to the first working chamber.

14. The rotary actuator as recited in claim 12 wherein the middle part includes a second axial bore running therethrough for supplying the second working chamber, the second axial bore communicating with a central distributor space disposed in an end face of the second ring collar.

15. The rotary actuator as recited in claim 14 wherein the bushing includes a radial bore passing therethrough, the radial bore connecting the second axial bore to the second working chamber.

16. The rotary actuator as recited in claim 1 further comprising supply connections disposed in an end face of the rotary actuator for supplying the first and second working chambers.

17. The rotary actuator as recited in claim 1 wherein the first cover is bolted to the second ring collar.

18. The rotary actuator as recited in claim 1 further comprising axial supply connections disposed in the first cover for supplying the first and second working chambers.

19. The rotary actuator as recited in claim 2 wherein the first cover is attached to the second ring collar and sealed with respect to the second ring collar.

20. The rotary actuator as recited in claim 1 wherein the covers have the same diameter.

21. The rotary actuator as recited in claim 1 wherein the outer body has the same diameter on an end face in an area of attachment to the second cover and in an area near the first cover.

22. A hydraulically operated rotary actuator comprising:

an outer body forming a gas-tight connection for a first element capable of being turned in a direction opposite from a turning direction of a second element;

inner body coaxial with the outer body and covered by the outer body axially over a full length of the inner body, the inner body and the outer body defining an annular space having first and second annular sections with different ring widths, the first and second annular sections disposed axially with respect to one another, the inner and outer bodies being fixed with respect to one another so as to enable them to turn axially in opposite directions, the inner body forming a gas-tight connection for the second element, the inner body including first and second ring collars for supporting the inner body with respect to the outer body, and a middle part disposed between the first and second ring collars, having essentially a same diameter over a length, the same diameter being less than a diameter of the first ring collar and diameter of the second ring collar, the first ring collar attached to the middle part;

a central clamping screw for urging the first ring collar against the middle part; and a sleeve disposed in the annular space and including an annular piston and a bushing axially connected to the annular piston, the annular piston moving on cylindrical surfaces of the inner body and the outer body and defining first and second working chambers capable of being acted upon by pressure, the bushing including first helical teeth on a radially inner side and second helical teeth on a radially outer side, the first helical teeth being oppositely angled from the second helical teeth, the first helical teeth engaging first corresponding teeth on the inner body and the second helical teeth engaging second corresponding teeth on the outer body.

23. The rotary actuator as recited in claim 22 wherein the first ring collar is connected to the middle part in a form-fitting and rotationally fixed manner.

24. A hydraulically operated rotary actuator comprising:

an outer body forming a gas-tight connection for a first element capable of being turned in a direction opposite from a turning direction of a second element;

an inner body coaxial with the outer body and covered by the outer body axially over a full length of the inner body, the inner body and the outer body defining an annular space having first and second annular sections with different ring widths, the first and second annular sections disposed axially with respect to one another, the inner and outer bodies being fixed with respect to one another so as to enable them to turn axially in opposite directions, the inner body forming a gas-tight connection for the second element, the inner body including first and second ring collars for supporting the inner body with respect to the outer body, and a middle part disposed between the first and second ring collars, having essentially a same diameter over a length, the same diameter being less than a diameter of the first ring collar and diameter of the second ring collar, the second ring collar forming an end wall of the first working chamber and including a first axial supply bore passing through the second ring collar and opening to the first working chamber; and a sleeve disposed in the annular space and including an annular piston and a bushing axially connected to the annular piston, the annular piston moving on cylindrical surfaces of the inner body and the outer body and defining first and second working chambers capable of being acted upon by pressure, the bushing including first helical teeth on a radially inner side and second helical teeth on a radially outer side, the first helical teeth being oppositely angled from the second helical teeth, the first helical teeth engaging first corresponding teeth on the inner body and the second helical teeth engaging second corresponding teeth on the outer body.

25. The rotary actuator as recited in claim 24 wherein the middle part includes a second axial bore running therethrough for supplying the second working chamber, the second axial bore communicating with a central distributor space disposed in an end face of the second ring collar.

26. The rotary actuator as recited in claim 25 wherein the bushing includes a radial bore passing therethrough, the radial bore connecting the second axial bore to the second working chamber.

* * * * *